C. G. CUNNINGHAM.
UNIVERSAL JOINT FOR STEAM, GAS, OR OTHER PIPES.
APPLICATION FILED MAY 23, 1916.
1,284,612.
Patented Nov. 12, 1918.
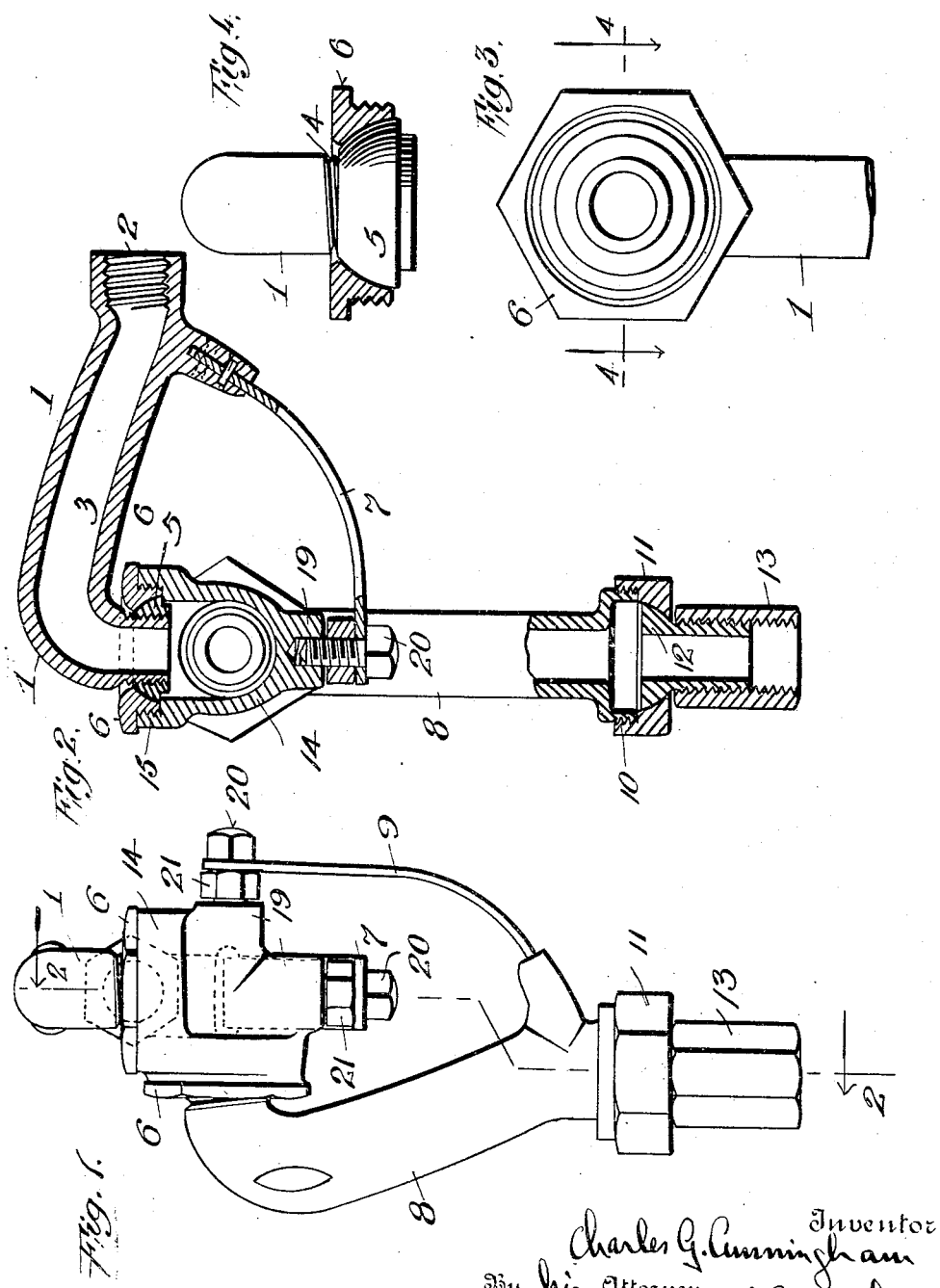

UNITED STATES PATENT OFFICE.

CHARLES G. CUNNINGHAM, OF NEW YORK, N. Y.

UNIVERSAL JOINT FOR STEAM, GAS, OR OTHER PIPES.

1,284,612.  Specification of Letters Patent.  Patented Nov. 12, 1918.

Application filed May 23, 1916. Serial No. 99,272.

*To all whom it may concern:*

Be it known that I, CHARLES G. CUNNINGHAM, a citizen of the United States, residing in New York, in the county and State of New York, have made a certain new and useful Invention in Universal Joints for Steam, Gas, or other Pipes, of which the following is a specification.

This invention relates to universal joints for steam, gas or other pipes.

The object of the invention is to provide a joint which is universal in operation, to connect pipes for handling steam, gas or other medium, having the same flexibility as the commercial universal joints employed in connection with shaftings, rods and the like.

A further object of the invention is to provide a universal joint which is capable of replacing flexible hose which is now used in connection with high pressure steam, water or gas pipes.

A further object of the invention is to provide a universal joint capable of allowing a fluid to pass therethrough, and which is perfectly air tight without the use of packing or the like.

A further object of the invention is to provide a universal joint which is economical to manufacture, and practically indestructible in use.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawing,—

Figure 1 is a view in elevation of a universal joint embodying my invention.

Fig. 2 is a sectional view of the same taken on the line 2, 2, Fig. 1, and looking in the direction of the arrows.

Fig. 3 is an enlarged face view of one yoke opening.

Fig. 4 is a sectional view of the same taken on the line 4, 4, Fig. 3.

The same part is designated by the same reference numeral wherever it occurs throughout the several views.

In carrying out my invention I employ a yoke 1 which is adapted to be screwed to a pipe connection at 2. One arm of the yoke is cored to permit free flow of fluid as indicated at 3, and is provided with exterior threads 4, adapted to have screwed thereon a ball shaped washer 5, the sides of which fit snugly in a socket nut 6. It will be seen that the ball washer 5, which may be of any suitable material, preferably of metal, coöperates with the socket nut 6, to effectively form a ball and socket fit to allow free movement between the washer and nut without allowing leakage. The other arm of the yoke 1 comprises a strip of metal 7, secured to the main body of the yoke in any desired or suitable manner.

In accordance with my invention, I provide a similar cored yoke 8 with spring arm 9, the open or free end of the yoke 9, however, being exteriorly flanged and provided with exterior threads 10 to receive a socket nut 11, carrying a ball ended tube 12, as shown, which ball ended tube fits snugly in the socket nut 11 to allow free movement in all directions of the tube 12, without allowing leakage therebetween when the ball is held in tight fit therewith. To insure tight fit between the ball and socket, and to allow attachment to a pipe or the like, I provide a suitable interiorly threaded coupling 13, adapted to screw over the tube 12, as shown, which draws the tube 12 and, the ball into snug fit with its associated socket nut 11.

To allow the fluid to flow from one yoke to the other, I provide an elbow 14, provided with interior threads 15, adapted to receive the socket nuts 6, of each of the yokes 1 and 8. Opposite to the receiving orifices of the elbow 14 are bored portions 19 which are threaded to receive bolts or screws 20, which secure the spring arms 7 and 9 of the respective yokes 1 and 8 to the elbow 14, as shown. Lock nuts 21, may be used to control the tension of the spring arms 7 and 9. For example, the spring arms may be so adjusted by the nuts 21 to exert a tension on the ball and socket joints so that the joint is steam tight when the pressure of the steam flowing through the joint is decreased.

When the joint is assembled as shown it will be seen that the respective yokes have universal movement relative to each other due to the ball and socket arrangement of attaching the same to the elbow 14. Further, due to the fact that the spring arms 7 and 9 exert a tension on the respective ball and socket connections, a fluid tight fit is secured without the use of bushings or the like, thereby greatly decreasing the cost and maintenance of the joint.

While I have shown and described a specific structure embodying the principles of my invention, I wish it to be understood that my invention, in its broad scope, is not to be limited thereto, as many modifications and changes in detail will readily suggest themselves to those skilled in the art without departing from the broad scope of my invention, as defined in the claims.

Therefore, what I claim as new and useful and of my own invention, and desire to secure by Letters Patent is, 1. A universal joint for connecting pipes through which steam or other medium flows, comprising an elbow, a pair of cored yokes adapted to communicate with each other through said elbow and means comprising ball and socket connections for pivotally connecting said yokes to said elbow and a spring permanently anchored in each of said yokes and pivotally connected to said elbow under tension for maintaining said ball and socket connections steam tight.

2. A universal joint for connecting pipes through which steam or other medium flows comprising a pair of yokes having one arm of each cored and adapted to communicate with each other through a joining piece, and means permanently anchored in each of said yokes and pivotally connected to said joining piece for exerting a spring tension on said connections to make the same air-tight.

3. A universal joint for connecting pipes through which steam or other medium flows comprising an elbow, a pair of yokes each provided with a cored arm and a spring arm, each of said cored arms terminating in a ball shaped head, socket nuts for securing said ball shaped heads to said elbow, and means for pivotally connecting said spring arms under tension to said elbow.

4. A universal joint for connecting pipes through which steam or other medium flows comprising an elbow, a pair of yokes each provided with a cored arm and a spring arm, each of said cored arms terminating in a ball shaped head, socket nuts carried by said cored arms for securing said ball shaped heads to said elbow, and means for pivotally connecting said spring arms to said elbow to exert a tension to cause said ball shaped heads to fit snugly in said socket nuts.

In testimony whereof I have hereunto set my hand on this 19th day of May A. D. 1916.

CHARLES G. CUNNINGHAM.

Copies of this patent may be obtained for five cents each, by addressing the "Commissioner of Patents, Washington, D. C."